US009207829B2

(12) United States Patent
Hsieh et al.

(10) Patent No.: US 9,207,829 B2
(45) Date of Patent: Dec. 8, 2015

(54) SMARTLY NAVIGATING HIERARCHICAL STRUCTURE STRINGS

(75) Inventors: Albert Hsieh, Taipei (TW); Chao Yuan Huang, Taipei (TW); Kee Hooi Yeow, Taipei (TW); Yao Kim Suan, legal representative, Kluang Johor (MY); Ng Geok Eng, legal representative, Kluang Johor (MY); Li-chuan Yen, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/340,567

(22) Filed: Dec. 29, 2011

(65) Prior Publication Data

US 2012/0254775 A1 Oct. 4, 2012

(30) Foreign Application Priority Data

Dec. 31, 2010 (TW) .............................. 99147402 A

(51) Int. Cl.
*G06F 3/0481* (2013.01)
*G06F 17/30* (2006.01)
*G06F 3/048* (2013.01)

(52) U.S. Cl.
CPC .............. *G06F 3/048* (2013.01); *G06F 3/0481* (2013.01); *G06F 17/3089* (2013.01); *G06F 17/30873* (2013.01); *G06F 17/30899* (2013.01); *G06F 17/30905* (2013.01)

(58) Field of Classification Search
CPC .................. G06F 3/017; G06F 3/048–3/04897
USPC .......................... 715/234, 760, 853–855, 858
See application file for complete search history.

(56) References Cited

U.S. PATENT DOCUMENTS

| | | | |
|---|---|---|---|
| 6,061,738 | A | 5/2000 | Osaku et al. |
| 7,191,411 | B2 | 3/2007 | Moehrle |
| 7,216,301 | B2 | 5/2007 | Moehrle |
| 7,240,292 | B2 | 7/2007 | Hally et al. |
| 7,505,965 | B2 | 3/2009 | Ivanov |
| 7,640,517 | B2 | 12/2009 | Moehrle |
| 7,725,836 | B2 | 5/2010 | Moehrle |
| 8,301,783 | B2 | 10/2012 | Behl et al. |
| 8,352,880 | B2 | 1/2013 | Moehrle |
| 8,392,897 | B2 | 3/2013 | Franz et al. |
| 2003/0227491 | A1 | 12/2003 | Moehrle |

(Continued)

FOREIGN PATENT DOCUMENTS

| | | | |
|---|---|---|---|
| CN | 1811767 | A | 8/2006 |
| CN | 101088087 | A | 12/2007 |

(Continued)

OTHER PUBLICATIONS

Fifesoft, Java Code Completion, an online publication posted on Nov. 15, 2009 at http://fifesoft.com/blog/?m=200911.*

(Continued)

*Primary Examiner* — Nicholas Ulrich
*Assistant Examiner* — Shangao Zhang
(74) *Attorney, Agent, or Firm* — Jordan IP Law, LLC

(57) ABSTRACT

A method, device, and computer program product for smartly navigating hierarchical structure strings are provided. The method may include tokenizing a hierarchical structure string by a delimiter, reading a hierarchical path to a string pointed by a pointer device between two adjacent delimiters, and fetching and displaying all available sibling hierarchical paths at the level next to the current level.

19 Claims, 8 Drawing Sheets

(56) References Cited

U.S. PATENT DOCUMENTS

| | | | | |
|---|---|---|---|---|
| 2004/0075693 | A1* | 4/2004 | Moyer et al. | 345/810 |
| 2004/0128275 | A1 | 7/2004 | Moehrle | |
| 2005/0246648 | A1* | 11/2005 | Miner et al. | 715/760 |
| 2006/0031771 | A1* | 2/2006 | MacHeffner | 715/749 |
| 2006/0167851 | A1 | 7/2006 | Ivanov | |
| 2006/0184892 | A1* | 8/2006 | Morris | 715/767 |
| 2007/0157094 | A1* | 7/2007 | Lemay et al. | 715/717 |
| 2007/0157127 | A1 | 7/2007 | Moehrle | |
| 2007/0168882 | A1 | 7/2007 | Moehrle | |
| 2008/0295003 | A1 | 11/2008 | Behl | |
| 2010/0017418 | A1 | 1/2010 | Gopalakrishnan et al. | |
| 2010/0037181 | A1* | 2/2010 | Moehrle | 715/843 |
| 2010/0042953 | A1 | 2/2010 | Stewart et al. | |
| 2013/0111411 | A1 | 5/2013 | Moehrle | |

FOREIGN PATENT DOCUMENTS

| | | | |
|---|---|---|---|
| CN | 101331486 | A | 12/2008 |
| CN | 101539949 | A | 9/2009 |
| CN | 101794318 | A | 8/2010 |
| CN | 101882052 | A | 11/2010 |

OTHER PUBLICATIONS

Microsoft, Windows 7 screen shot, Windows 7 became generally available on Oct. 22, 2009.*

D. Orner et al., “Histree—A Hierarchical Back Menu”, IADIS International Conference WWW/Internet 2006—vol. II, Histree, pp. 78-82, Murcia Spain.

* cited by examiner

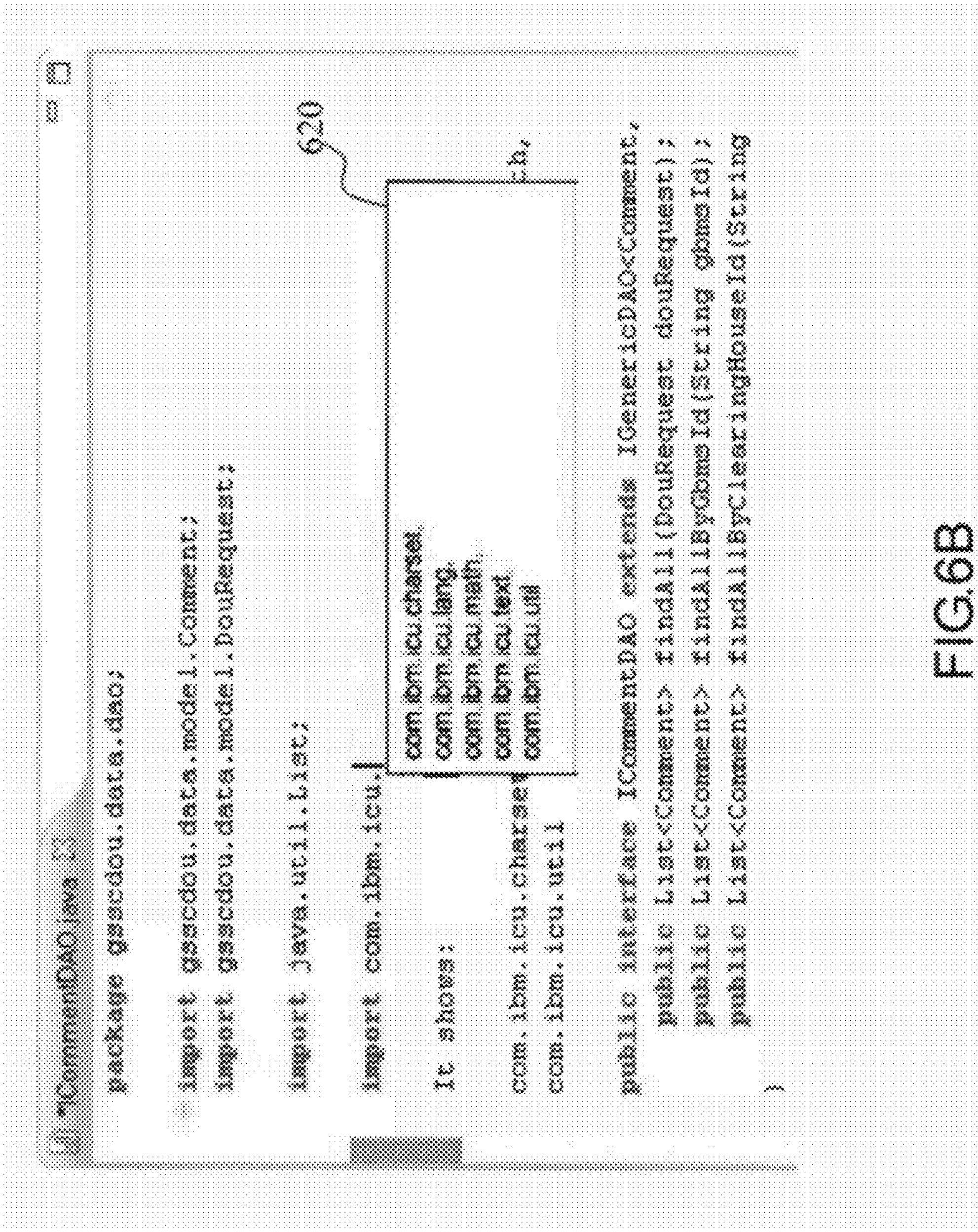

FIG.6B

```
*ICommentDAO.java
package gascdou.data.dao;

import gascdou.data.model.Comment;
import gascdou.data.model.DouRequest;

import java.util.List;

import com.ibm.icu.

It shows:
com.ibm.icu.charset      com.ibm.icu.charset
com.ibm.icu.util          com.ibm.icu.lang
                          com.ibm.icu.math
                          com.ibm.icu.text
                          com.ibm.icu.util

public interface ICommentDAO extends IGenericDAO<Comment,
    public List<Comment>  findAll(DouRequest  douRequest);
    public List<Comment>  findAllByObmsId(String gbmsId);
    public List<Comment>  findAllByClearingHouseId(String
```

620

SMARTLY NAVIGATING HIERARCHICAL STRUCTURE STRINGS

BACKGROUND

Embodiments of the present invention relate to a method, system, and program product for smartly navigating hierarchical structure strings. Specifically speaking, embodiments of the present invention relate to a method, system, and program product whereby a user visits package hierarchical paths in an integrated development environment (IDE) or catalogs and parent-level Webpages of hierarchical structure strings in a simpler way.

A hierarchical structure is usually used to organize items in order such that wanted ones can be efficiently found in a subsequent item search. For example, a conventional path menu system for navigating a path of a catalog of files stored in a storage disk is provided according to the prior art. The path menu system navigates between different folders. The folders represent different levels in the folder hierarchical structure, respectively. A folder could further include one or more sub-folders.

Likewise, a Uniform Resource Locator (URL) of a Web path, as provided according to the prior art, operates in a way similar to the path menu system does, when accessing a Webpage or other network-based services. However, the prior art requires that a user delete a redundant string and then press the Enter key in order to visit parent-level Webpages while surfing the Internet. For example, FIG. 1 depicts an instance of a Webpage 100 displayed on a display interface of a conventional browser.

The user is browsing a URL field 110, and the user wants to visit its parent level Webpage (e.g., "... ibm.com/software/"). If the Web designer does not comply with W3C standards or a site map is not available on the Website, the Webpage will not give you something like a "where are you?" 120 prompt as shown in FIG. 1. Hence, the user has to delete "lotus/category/email/" by hand and then press the Enter key, which is such a hassle. Furthermore, the path menu system of a file catalog is confronted with a similar problem.

Accordingly, it may be advantageous to provide a simpler way of visiting catalogs or parent-level Webpages of a hierarchical structure string.

BRIEF SUMMARY

Several specific embodiments of the present invention are hereunder put forth to address, but not limited to, issues facing the prior art and especially problems and needs regarding visiting parent-level Webpages of a hierarchical structure string. Hence, the present invention provides a method, system, and program product for smartly navigating hierarchical structure strings with a view to overcoming the drawbacks of the prior art.

Disclosed are a method, system, and program product for smartly navigating hierarchical structure strings. The method may include the steps of tokenizing a hierarchical structure string by a delimiter, reading a hierarchical path to a string pointed at by a pointing device between two adjacent delimiters, and fetching and displaying all available sibling hierarchical paths at the level next to or below the current level.

The pointing device may be a mouse, a finger or a stylus for use with a touch screen. The reading may respond to an input of a combination of pressing and holding one of a right-click button and a left-click button and pressing down a default shortcut key simultaneously when the pointing device points at a string between two adjacent delimiters. The hierarchical structure strings may be package hierarchical paths in an integrated development environment (IDE), file paths of a catalog structure, or a URL.

Further disclosed is a data processing system for smartly navigating hierarchical structure strings. The data processing system includes a host. The host has a bus, a memory, and a processor. The memory is connected to the bus, wherein the memory includes a set of instructions. The processor is connected to the bus, wherein the processor executes the set of instructions to perform the method of the present invention.

Further disclosed is a program product in a computer recording medium with a program stored thereon. The program includes program codes for causing the data processing system to execute the method for smartly navigating hierarchical structure strings.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

According to an embodiment of the present invention, there is provided a method comprising tokenizing a hierarchical structure string by a delimiter, reading a hierarchical path to a string pointed at by a pointing device between two adjacent delimiters, fetching all available sibling hierarchical paths at a level next to a current level, and displaying the all available sibling hierarchical paths at the level next to the current level.

According to an embodiment of the present invention, there is provided a method comprising tokenizing a Web path by a delimiter, reading a uniform resource locator (URL) to a string pointed at by a pointing device between two adjacent delimiters, and downloading the Webpage addressed by said URL.

According to another embodiment of the present invention, there is provided a system comprising a host, said host including a bus, a memory connected to said bus, in which said memory comprises a set of instructions, and a processor connected to said bus, in which said processor executes said set of instructions to tokenize a hierarchical structure string by a delimiter, read a hierarchical path to a string pointed at by a pointing device between two adjacent delimiters, fetch all available sibling hierarchical paths at a level next to a current level, and display the all available sibling hierarchical paths at the level next to the current level.

According to another embodiment of the present invention, there is provided a computer readable storage medium comprising a set of instructions, which, if executed by a processor, cause a computer to tokenize a hierarchical structure string by a delimiter, read a hierarchical path to a string pointed at by a pointing device between two adjacent delimiters, fetch all available sibling hierarchical paths at the level next to the current level, and display all available sibling hierarchical paths at the level next to the current level.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 6A and FIG. 6B illustrates an embodiment of an integrated development environment displayed according to another specific embodiment of the present invention.

DETAILED DESCRIPTION

Figure 1:
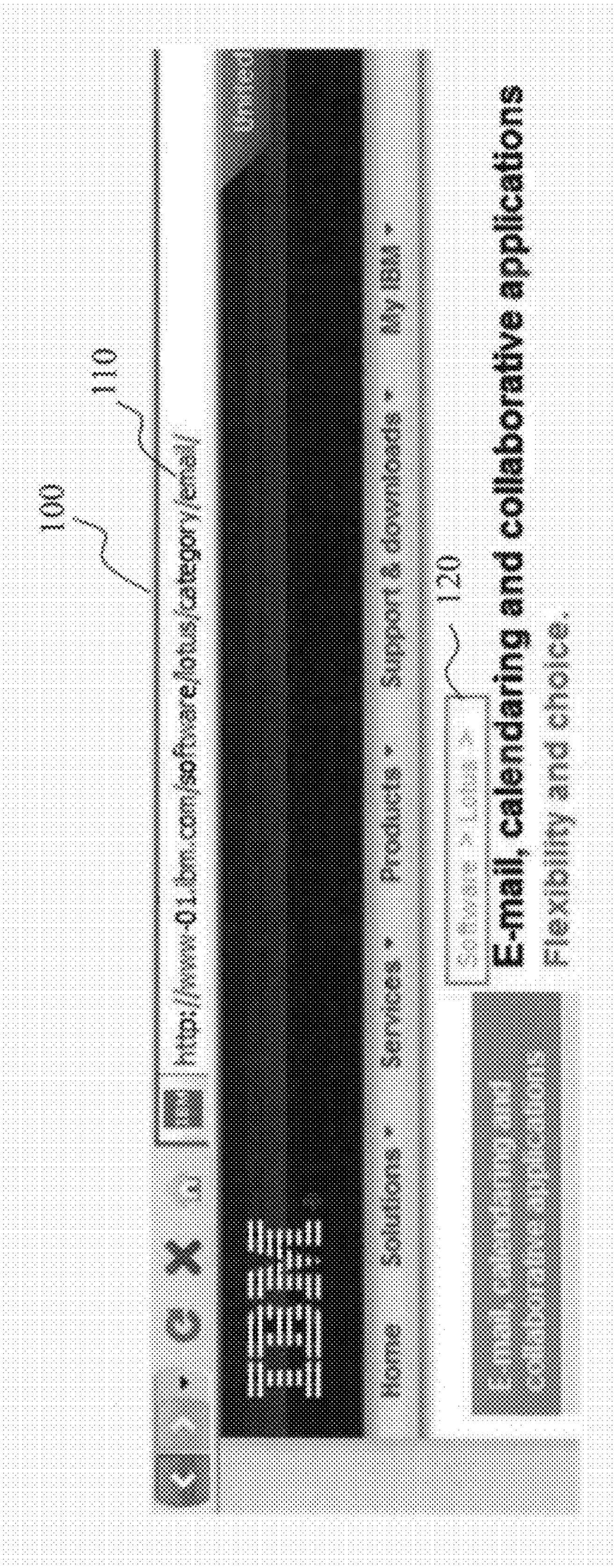
FIG. 1 illustrates an embodiment of a Webpage displayed on a display interface of a conventional browser.

A method, system, and program product for smartly navigating hierarchical structure strings according to embodiments of the present invention will be described below with reference to the accompanying drawings.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks. Several specific embodiments of the present invention are hereunder put forth to address, but not limited to, issues facing the prior art and especially problems and needs regarding visiting parent-level Webpages of a hierarchical structure string. Hence, the present invention provides a method, system, and program product for smartly navigating hierarchical structure strings with a view to overcoming the drawbacks of the prior art.

Referring now to FIG. 3 through FIG. 7, a system, devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
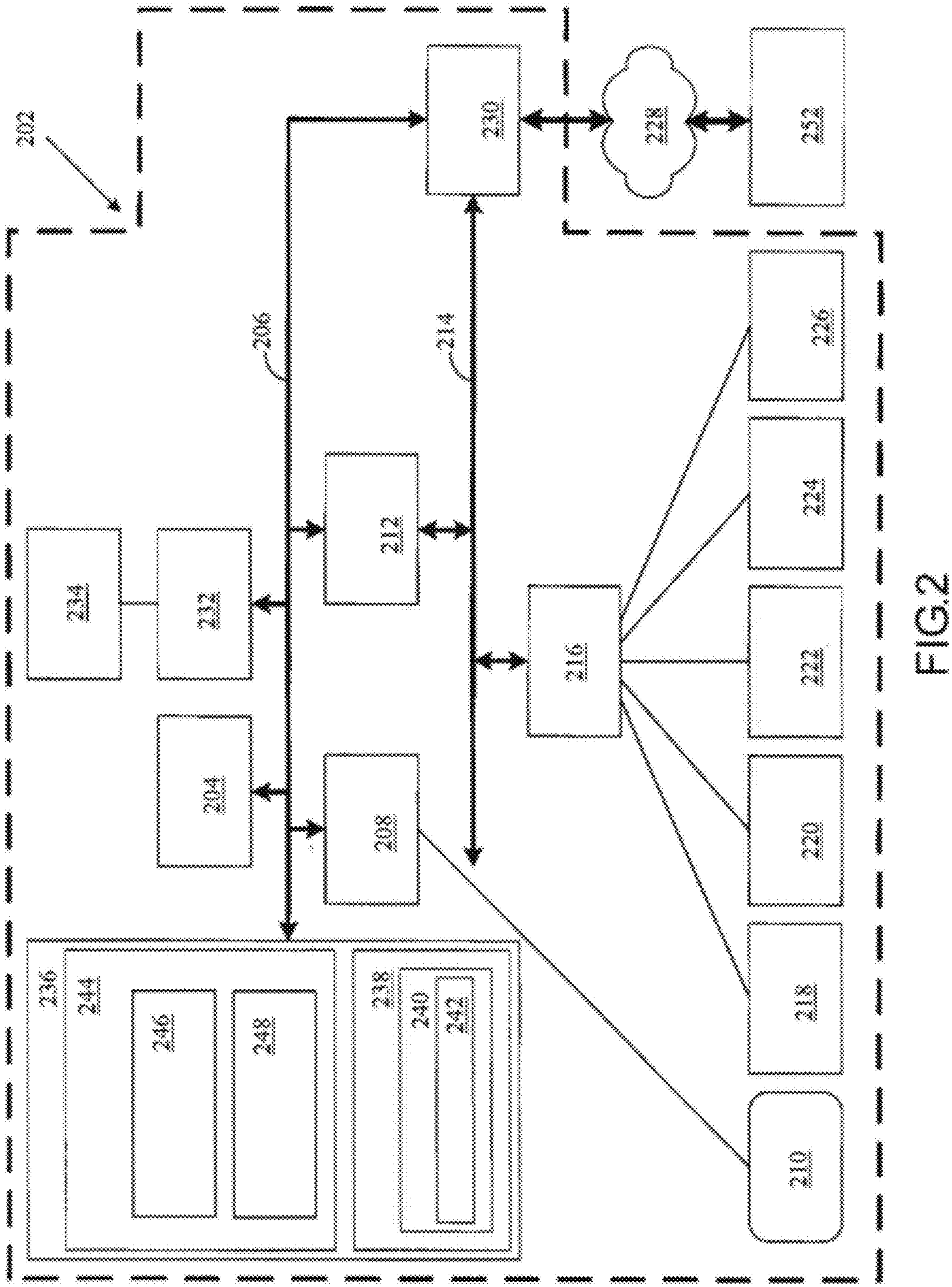
FIG. 2 illustrates a block diagram illustrative of a hardware environment of a client computer 202 according to an embodiment.

FIG. 2 is a block diagram illustrative of a hardware environment of a client computer 202 of the present invention. According to the present invention, a client-end computer could be an electronic product capable of executing an application program for providing real-time information, e-mails, or short message service (SMS) or sending data, and the electronic product is a desktop computer, notebook computer, terminal apparatus, mobile phone, or personal digital assistant (PDA). Also, the client-end computer executes application programs for providing services, such as word processing or a browser. In an exemplary embodiment, the client-end computer is a universal desktop computer that includes: a processor for executing various application programs; a storage device for storing various information and codes; a display device as well as a communication and input/output device for functioning as an interface for communicating with the user; and peripheral components or other components serving a specific purposes. In another embodiment, the present invention can be implemented in a variant manner that the quantity of the constituent devices or components is subject to change. According to the present invention, the network is a connection in any form, including a dedicated local area network (LAN), a wide area network (WAN), or a dial-up Internet access service offered by an Internet service provider (ISP), and is not limited to a cable connection or a wireless connection. A point to note is that the network may includes any other hardware or software components not shown, such as an additional computer system, router, or firewall.

A client computer 202 includes a processor unit 204 coupled to a system bus 206. Also coupled to system bus 206 is a video adapter 208, which drives/supports a display 210. System bus 206 is coupled via a bus bridge 212 to an Input/Output (I/O) bus 214. Coupled to I/O bus 214 is an I/O interface 216, which affords communication with various I/O devices, including a keyboard 218, a mouse 220, a Compact Disk-Read Only Memory (CD-ROM) 222, a floppy disk drive 224, and a flash drive memory 226. The format of the ports connected to I/O interface 216 may be any known to those skilled in the art of computer architecture, including but not limited to Universal Serial Bus (USB) ports.

Client computer 202 is able to communicate with a service provider server 252 via a network 228 using a network interface 230, which is coupled to system bus 206. Network 228 may be an external network such as the Internet, or an internal network such as an Ethernet or a Virtual Private Network (VPN). Using network 228, client computer 202 is able to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes client computer 202's operating system (OS) 238 and application programs 244.

OS 238 includes a shell 240, for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while shell 240 is a text-based, line-oriented user interface, the present invention will equally well support other user interface modes, such as graphical, voice, gestural, etc. As depicted, OS 238 also includes kernel 242, which includes lower levels of functionality for OS 238, including providing essential services required by other parts of OS 238 and application programs 244, including memory management, process and task management, disk management, and mouse and keyboard management.

Application programs 244 include a browser 246. Browser 246 includes program modules and instructions enabling a World Wide Web (WWW) client (i.e., client computer 202) to send and receive network messages to the Internet using HyperText Transfer Protocol (HTTP) messaging, thus enabling communication with service provider server 252.

The application programs 244 further includes a smart navigating module 248. The smart navigating module 248 can be a plug-in for the browser 246, or can operate in the form of a daemon. However, in another embodiment, the smart navigating module 248 operates in the form of a variant program.

Figure 5:
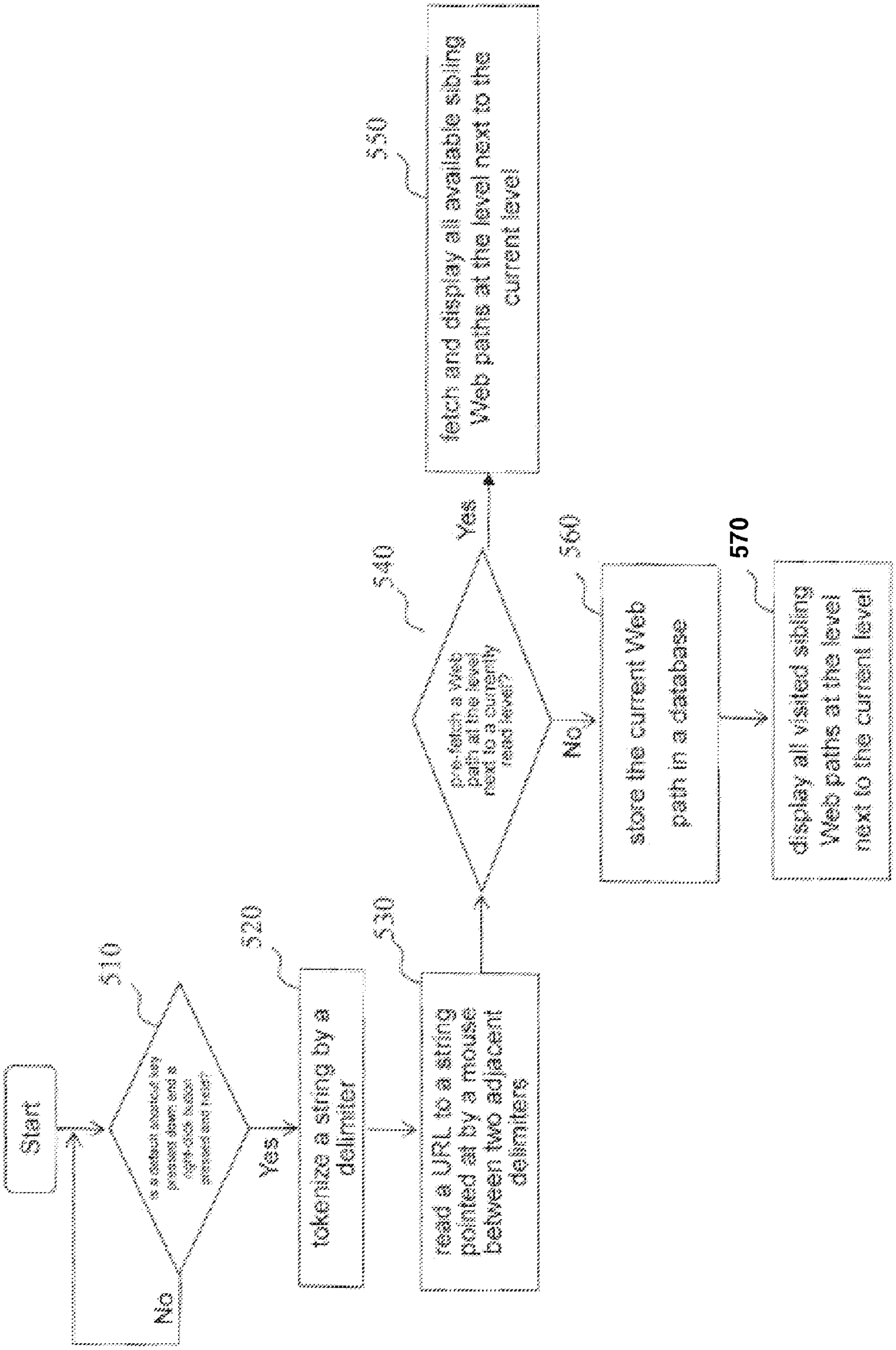
FIG. 5 illustrates a flowchart of a method based on a smart navigating module 248 of FIG. 4 according to a specific embodiment of the present invention.
Figure 7:
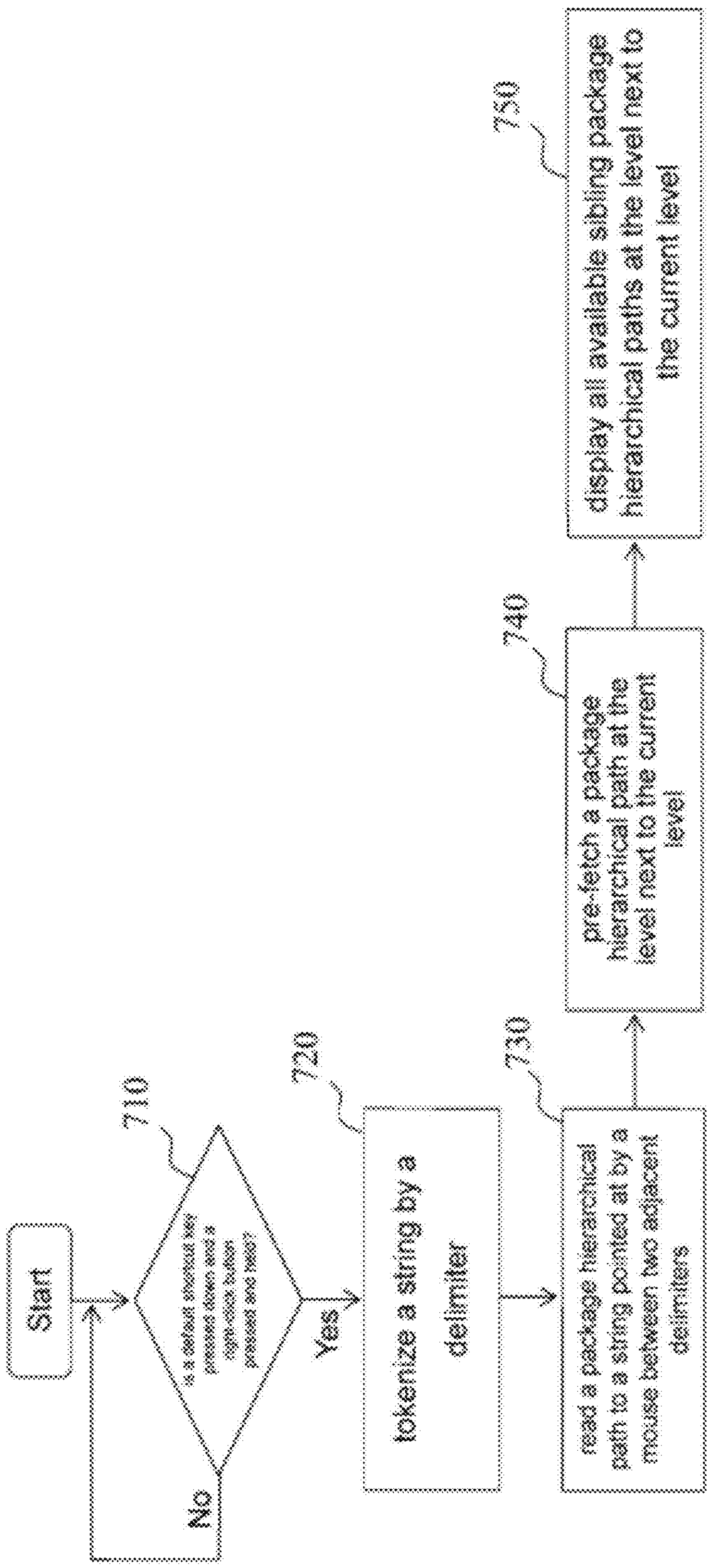
FIG. 7 illustrates a flowchart of the method based on the smart navigating module 248 of FIG. 6A and FIG. 6B according to an embodiment of the present invention.

The smart navigating module 248 includes a code for executing a program described in FIGS. 5 and 7. In an embodiment, the client computer 202 can download a selected Webpage from a service provider server 252.

The hardware elements depicted in client computer 202 are not intended to be exhaustive, but rather are representative to highlight essential components required by the present invention. For instance, client computer 202 may include alternate memory storage devices such as magnetic cassettes, Digital Versatile Disks (DVDs), Bernoulli cartridges, and the like.

These and other variations are intended to be within the spirit and scope of the present invention.

<First Embodiment>

Figure 3:
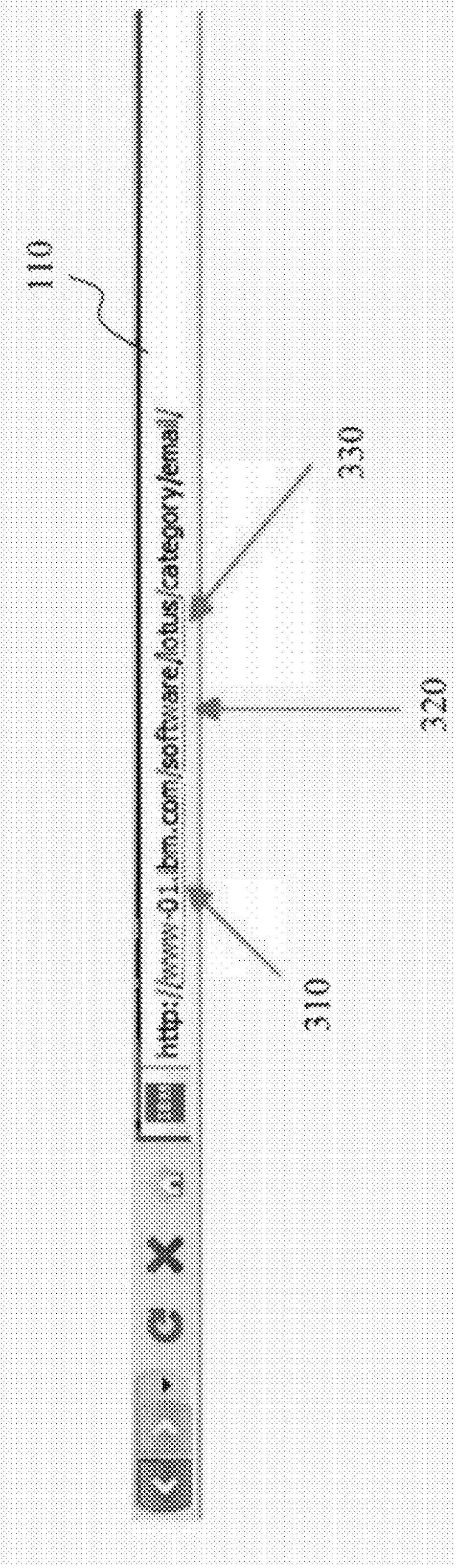
FIG. 3 illustrates an embodiment of a Webpage 100 displayed on a display interface of a browser according to a specific embodiment of the present invention.

FIG. 3 shows an instance of a Webpage 100 displayed on a display interface of a browser according to a specific embodiment of the present invention. Given a device (such as a personal computer or a notebook computer) equipped with a keyboard, if the mouse points at a string between a pair of delimiters (such as twin slashes (//) or a slash (/) of the URL field 110 shown in FIG. 3) of a URL and the user presses the right-click button and a predetermined shortcut key simultaneously, the smart navigating module 248 will read a URL to a string pointed at by the mouse between two adjacent delimiters and send a request to the service provider server 252 for downloading therefrom a Webpage pointed at by the read URL. For example, if the mouse points at a string "www-01.ibm.com" 310, a "software" 320, and a "lotus" 330 and the user presses the right-click button and a predetermined shortcut key simultaneously, the smart navigating module 248 will send requests to URLs . . . www-01.ibm.com/, . . . www-01.ibm.com/software/, and . . . www-01.ibm.com/software/lotus/ respectively for downloading Webpages pointed at by the URLs. In another embodiment, the left-click button substitutes for the right-click button, and the present invention is not restrictive of such a technical feature. Furthermore, the aforesaid operation can be effectuated, even if the mouse serving as the pointing device is replaced with a finger or a stylus working in conjunction with a device (such as a cell phone or a tablet) equipped with a touchscreen.

<Second Embodiment>

Figure 4:
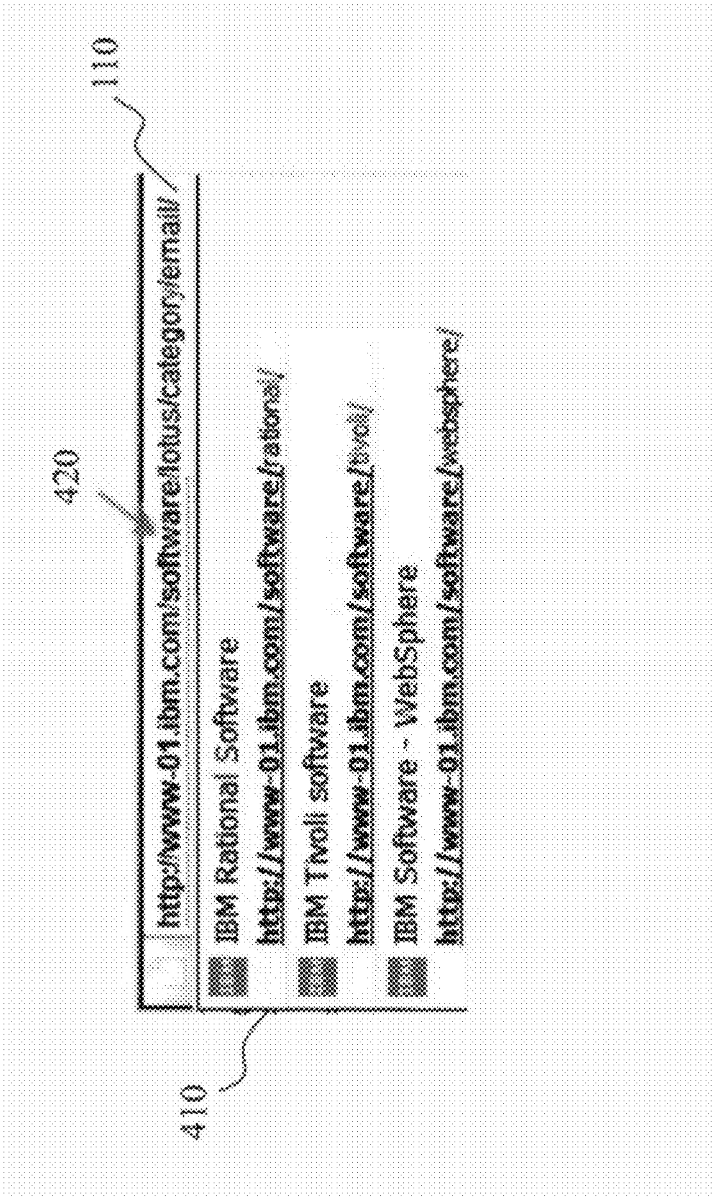
FIG. 4 illustrates an embodiment of the Webpage 100 displayed on a display interface of a browser according to another specific embodiment of the present invention.

FIG. 4 shows an instance of the Webpage 100 displayed on a display interface of a browser according to another specific embodiment of the present invention. Similarly, if the mouse points at a string, such as a "software" 420, between a pair of delimiters of a URL and the user presses down a predetermined shortcut key while pressing and holding the right-click button, the smart navigating module 248 will read a URL to a string pointed at by the mouse between the delimiters and selectively enumerate the URL located at the level next to or below the current level and previously visited by the user or enumerate all sibling URLs 410 at the level next to or below the current level. Implementation of the smart navigating module 248 in this embodiment is further described below by referring to FIG. 5. In another embodiment, the left-click button substitutes for the right-click button, and the present invention is not restrictive of this technical feature. Likewise, as mentioned earlier, in a further embodiment, a button of the mouse is not limited to the right-click button, nor is the pointing device limited to the mouse. For example, the aforesaid operation can be effectuated, even if the mouse is replaced with a finger or a stylus working in conjunction with a device equipped with a touch screen.

FIG. 5 is a flowchart of a method based on the smart navigating module 248 of FIG. 4 according to a specific embodiment of the present invention. The smart navigating module 248 can operate in the form of a daemon. As shown in the drawing, in step 510, the smart navigating module 248 determines whether a predetermined shortcut key is pressed down while the right-click button is being pressed and held. After the smart navigating module 248 has received a confirmation, a string of the current URL is tokenized by a delimiter (step 520), and a URL is read to a string pointed at by the mouse between two adjacent delimiters (step 530). Step 540 involves determining whether to pre-fetch a URL at the level next to or below a currently read level. An affirmative determination is followed by the step of fetching all URLs on a Webpage pointed at by the URL at the current level and displaying all available sibling URLs at the level next to or below the currently read level (step 550). A negative determination is followed by the step of storing the current URL directly (step 560). Afterward, all visited sibling Web paths at the level next to or below the currently read level are displayed (step 570). A point to note is that, in another embodiment, step 540 can be omitted, such that step 530 is immediately followed by the step of displaying all available sibling URLs at the level next to or below the currently read level or the step of displaying all visited sibling Web paths at the level next to or below the currently read level.

Similarly, in the path menu system of a catalog of files stored in a magnetic disk, it is feasible for the mouse to point at a position between two adjacent delimiters of a pair of backslashes (\) of a file path and for the user to press the right-click button and a default shortcut key simultaneously, and then the smart navigating module 248 reads a file path to a string pointed at by the mouse between two adjacent delimiters and displays all available sibling catalogs at the level next to the currently read level. Likewise, as mentioned earlier, in other embodiments, a button of the mouse is not limited to the right-click button, nor is the pointing device limited to the mouse. For example, the aforesaid operation can be effectuated, even if the mouse is replaced with a finger or a stylus working in conjunction with a device equipped with a touch screen.

<Third Embodiment>

An integrated development environment (IDE) (such as ECLIPSE) whereby an Internet service developer designs application programs usually provides plenty of packages for use by the developer. Dot-shaped delimiters are arranged on the packages to form a hierarchical structure. As a result, the developer is confronted with problems about visiting parent level Webpages of hierarchical structure strings, when using the packages.

Figure 6A:
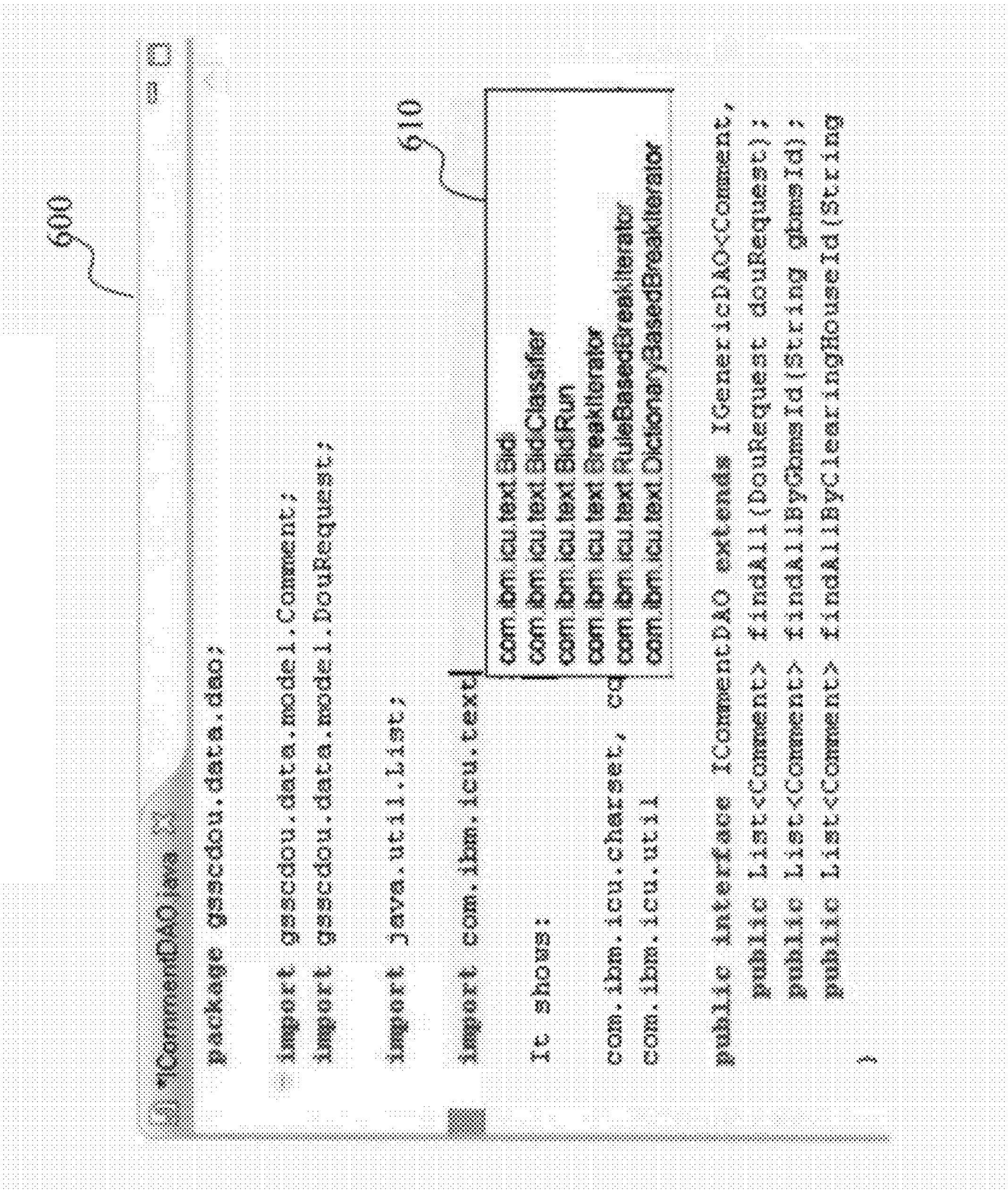

FIG. 6A and FIG. 6B show an instance 600 of an integrated development environment displayed according to another specific embodiment of the present invention. If the mouse points at between a pair of delimiters "." of package hierarchical paths, such as a text, and the user presses down a predetermined shortcut key while pressing and holding the right-click button, the smart navigating module 248 will read a package hierarchical path to a string pointed at by the mouse between the delimiters and selectively enumerate the package hierarchical paths located at the level next to or below the current level and previously visited by the user or enumerate all sibling package hierarchical paths 610, 620 at the level next to or below the current level. Likewise, as mentioned earlier, in other embodiments, a button of the mouse is not limited to the right-click button, nor is the pointing device limited to the mouse. For example, the aforesaid operation can be effectuated, even if the mouse is replaced with a finger or a stylus working in conjunction with a device equipped with a touch screen.

FIG. 7 is a flowchart of the method based on the smart navigating module 248 of FIG. 6A and FIG. 6B according to an embodiment of the present invention. The smart navigating module 248 can operate in the form of a daemon. As shown in the drawing, in step 710, the smart navigating module 248 determines whether a default shortcut key is pressed down while the right-click button is being pressed and held. After the smart navigating module 248 has received a confirmation, a string of the current package hierarchical path is tokenized by a delimiter (step 720), and then a package hierarchical path is read to a string pointed at by the mouse between two adjacent delimiters (step 730). In step 740, a package hierarchical path at the level next to the currently read level is pre-fetched. In step 750, all available sibling package hierarchical paths at the level next to the currently read level are displayed.

The above description is about exemplary embodiments that are illustrative rather than restrictive of the present invention; hence, the disclosure of the present invention is subject to change as appropriate. For example, package hierarchical paths in FIG. 6 are not necessarily acquired by the client computer 202; instead, the package hierarchical paths can also be downloaded from the service provider server 252. The present invention also applies to any situations other than an integrated development environment (IDE). All strings of a hierarchical structure are applicable to the present invention.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

We claim:

1. A method comprising:

tokenizing a hierarchical structure string by a delimiter;

reading a hierarchical path to a string pointed at by a pointing device between any two adjacent delimiters, wherein there are at least three delimiters and at least two strings therebetween;

fetching only previously visited sibling hierarchical paths at a level next to a current level, wherein the current level is defined by the string pointed at by the pointing device between the any two adjacent delimiters; and displaying only the hierarchical structure string and only the fetched sibling hierarchical paths at the level next to the current level.

2. The method of claim 1, wherein said pointing device is one of a mouse, a finger and a stylus for use with a touch screen.

3. The method of claim 2, wherein said reading responds to an input of a combination of pressing one of a right-click button and a left-click button and pressing down a predetermined shortcut key simultaneously when said pointing device points at a string between two adjacent delimiters.

4. The method of claim 2, wherein said reading responds to an input of a combination of pressing and holding one of a right-click button and a left-click button and pressing down a predetermined shortcut key simultaneously when said pointing device points at a string between two adjacent delimiters.

5. The method of claim 2, wherein said hierarchical structure strings are package hierarchical paths in one of an integrated development environment (IDE), file paths of a catalog structure, and a uniform resource locator (URL).

6. A method comprising:

tokenizing a Web path by a delimiter, the web path having at least a first level and a second level next to the first level, wherein the Web path is indicated in an address bar of a web browser window;

reading a first uniform resource locator (URL) to a string pointed at in the address bar by a pointing device between two adjacent delimiters at the first level in response to a first input;

downloading the Webpage addressed by said first URL;

enumerating only URLs located at the second level that correspond to web pages that have previously been downloaded;

reading one of the enumerated URLS located at the second level in response to a second input; and downloading the Webpage addressed by said one of the enumerated URLs.

7. The method of claim 6, wherein said pointing device is one of a mouse, a finger or a stylus for use with a touchscreen.

8. The method of claim 7, wherein said reading responds to an input of a combination of pressing one of a right-click button and a left-click button and pressing down a default shortcut key simultaneously when said pointing device points at a string between two adjacent delimiters.

9. A system comprising:

a host, said host including:

a bus;

a memory connected to said bus, in which said memory includes a set of instructions; and a processor connected to said bus, in which said processor executes said set of instructions to:

tokenize a hierarchical structure string by a delimiter;

read a hierarchical path to a string pointed at by a pointing device between any two adjacent delimiters, wherein there are to be at least three delimiters and at least two strings therebetween;

fetch only sibling hierarchical paths at a level next to a current level that have previously been visited, wherein the current level is to be defined by the string pointed at by the pointing device between the any two adjacent delimiters; and display only the hierarchical structure string and the fetched sibling hierarchical paths at the level next to the current level.

10. The system of claim 9, wherein the set of instructions are executed to render an interface for manipulation by a user.

11. The system of claim 9, wherein said pointing device is one of a mouse, a finger and a stylus for use with a touch screen.

12. The system of claim 11, wherein said reading responds to an input of a combination of pressing one of a right-click button and a left-click button and pressing down a predetermined shortcut key simultaneously when said pointing device points at a string between two adjacent delimiters.

13. The system of claim 11, wherein said reading responds to an input of a combination of pressing and holding one of a right-click button and a left-click button and pressing down a predetermined shortcut key simultaneously when said pointing device points at a string between two adjacent delimiters.

14. The system of claim 11, wherein said hierarchical structure strings are one of package hierarchical paths in an integrated development environment (IDE), file paths of a catalog structure, and a URL.

15. A non-transitory computer readable storage medium comprising a set of instructions, which, if executed by a processor, cause a computer to:

tokenize a hierarchical structure string by a delimiter;

read a hierarchical path to a string pointed at by a pointing device between any two adjacent delimiters, wherein there are to be at least three delimiters and at least two strings therebetween;

fetch only previously visited sibling hierarchical paths at the level next to the current level, wherein the current level is to be defined by the string pointed at by the pointing device between the any two adjacent delimiters; and display only the hierarchical structure string and only the fetched sibling hierarchical paths at the level next to the current level.

16. The medium according to claim 15, wherein said pointing device is one of a mouse, a finger and a stylus for use with a touch screen.

17. The medium according to claim 16, wherein said reading responds to an input of a combination of pressing one of a right-click button and a left-click button and pressing down a predetermined shortcut key simultaneously when said pointing device points at a string between two adjacent delimiters.

18. The medium according to claim 16, wherein said reading responds to an input of a combination of pressing and holding one of a right-click button and a left-click button and pressing down a predetermined shortcut key simultaneously when said pointing device points at a string between two adjacent delimiters.

19. The medium according to claim 16, wherein said hierarchical structure strings are one of package hierarchical paths in an integrated development environment (IDE), file paths of a catalog structure, and a URL.

* * * * *